US011344384B2

(12) United States Patent
Stemmer et al.

(10) Patent No.: US 11,344,384 B2
(45) Date of Patent: May 31, 2022

(54) MOCKUP FOR DENTAL COSMETIC RESTORATION AND DENTAL OVERLAY DEVICE

(71) Applicant: LYRA HOLDING, Saint-Gilles (BE)

(72) Inventors: Armand Stemmer, Paris (FR); Jean-Baptiste Lennes, Villiers sur Saint Leur (FR); Michael Ohana, La Garenne-Colombes (FR); Charles Louis Marie Deville, Asnières sur Seine (FR)

(73) Assignee: LYRA HOLDING, Saint-Gilles (BE)

( * ) Notice: Subject to any disclaimer, the term of this patent is extended or adjusted under 35 U.S.C. 154(b) by 477 days.

(21) Appl. No.: 15/751,622

(22) PCT Filed: Jul. 25, 2016

(86) PCT No.: PCT/EP2016/067636
§ 371 (c)(1),
(2) Date: Feb. 9, 2018

(87) PCT Pub. No.: WO2017/025304
PCT Pub. Date: Feb. 16, 2017

(65) Prior Publication Data
US 2018/0243051 A1    Aug. 30, 2018

(30) Foreign Application Priority Data

Aug. 10, 2015  (FR) ...................................... 1557643
Feb. 3, 2016   (FR) ...................................... 1650857

(51) Int. Cl.
*A61C 5/20*     (2017.01)
*A44C 15/00*    (2006.01)
(Continued)

(52) U.S. Cl.
CPC .............. *A61C 5/20* (2017.02); *A44C 15/007* (2013.01); *A61C 5/30* (2017.02); *A61C 9/0053* (2013.01);
(Continued)

(58) Field of Classification Search
CPC ........... A61C 5/20; A61C 5/30; A61C 9/0053; A61C 13/0019; A61C 13/34;
(Continued)

(56) References Cited

U.S. PATENT DOCUMENTS 4,015,332 A *  4/1977  Manne ..................... A61C 5/70
                                                     433/219
5,092,022 A    3/1992  Duret
(Continued)

FOREIGN PATENT DOCUMENTS

CN    202859366 U    4/2013
CN    104116569 A   10/2014
(Continued)

OTHER PUBLICATIONS

International Search Report and Written Opinion dated Oct. 12, 2016 issued in corresponding application No. PCT/EP2016/067636; w/ English partial translation and partial machine translation (33 pages).
(Continued)

*Primary Examiner* — Yogesh P Patel
(74) *Attorney, Agent, or Firm* — Westerman, Hattori, Daniels & Adrian, LLP

(57) ABSTRACT

Method for producing a mockup of a patient's dental cosmetic restoration, characterized in that it comprises a step (E4) of forming a file of digital data representing the dental mockup artificially presenting the restoration intended to be placed in the mouth and worn temporarily over at least part
(Continued)

of the patient's dentition, and a step (E5) of fabricating the mockup directly from the file of digital data produced.

12 Claims, 3 Drawing Sheets

(51) Int. Cl.
| | | |
|---|---|---|
| *A61C 13/107* | (2006.01) | |
| *A61C 13/00* | (2006.01) | |
| *A61C 5/30* | (2017.01) | |
| *A61C 9/00* | (2006.01) | |
| *A61C 13/34* | (2006.01) | |

(52) U.S. Cl.
CPC ...... *A61C 13/0001* (2013.01); *A61C 13/0004* (2013.01); *A61C 13/0019* (2013.01); *A61C 13/34* (2013.01)

(58) Field of Classification Search
CPC ............ A61C 13/0001; A61C 13/0004; A61C 13/0006; A61C 5/00; A61C 5/35; A61C 9/008; A61C 9/0086; A44C 15/007
USPC .......................................... 433/223, 178, 219
See application file for complete search history.

(56) References Cited

U.S. PATENT DOCUMENTS

| | | | |
|---|---|---|---|
| 5,324,198 A | 6/1994 | Hazen | |
| 7,357,637 B2* | 4/2008 | Liechtung | A61C 7/08 433/167 |
| 2002/0150859 A1* | 10/2002 | Imgrund | A61C 9/0053 433/24 |
| 2007/0009855 A1* | 1/2007 | Stonisch | A61C 19/10 433/215 |
| 2007/0059667 A1* | 3/2007 | Lim | A44C 15/007 433/219 |
| 2007/0264614 A1* | 11/2007 | Kim | A44C 15/007 433/215 |
| 2008/0003541 A1* | 1/2008 | Leslie-Martin | A61C 5/00 433/215 |
| 2008/0108018 A1 | 5/2008 | Miwa | |
| 2010/0281370 A1 | 11/2010 | Rohaly et al. | |
| 2011/0033815 A1* | 2/2011 | Stonisch | A61C 19/10 433/24 |
| 2011/0159451 A1* | 6/2011 | Kuo | A61C 9/004 433/24 |
| 2012/0178045 A1* | 7/2012 | Massad | A61C 13/0001 433/171 |
| 2013/0226534 A1* | 8/2013 | Fisker | B33Y 50/00 703/1 |
| 2013/0302753 A1* | 11/2013 | Lin | A61C 13/2656 433/178 |
| 2014/0069441 A1 | 3/2014 | Moses | |

FOREIGN PATENT DOCUMENTS

| | | |
|---|---|---|
| EP | 0 110 797 A1 | 6/1984 |
| JP | 2005304904 A | 11/2005 |
| JP | 2008113851 A | 5/2008 |
| JP | 2013-230232 A | 11/2013 |
| JP | 2015-512676 A | 4/2015 |
| WO | 2013/130552 A1 | 9/2013 |

OTHER PUBLICATIONS

Office Action dated Aug. 25, 2020, issued in counterpart CN Application No. 201680056113.0, with English Translation. (19 pages).

Office Action dated Jun. 16, 2020, issued in counterpart JP Application 2018-527003, with English translation (24 pages).

Office Action dated May 25, 2021, issued in counterpart JP application No. 2018-527003, with English translation. (10 pages).

* cited by examiner

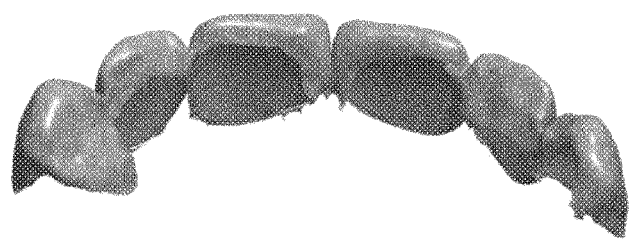
FIGURE 3
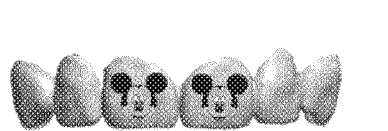  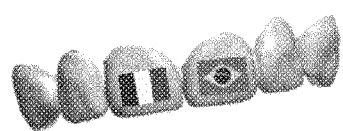  
FIGURE 4A    FIGURE 4B    FIGURE 4C
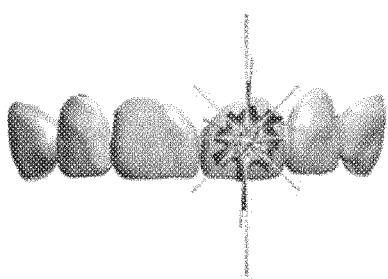
FIGURE 4D

MOCKUP FOR DENTAL COSMETIC RESTORATION AND DENTAL OVERLAY DEVICE

FIELD OF THE INVENTION

The invention relates to the field of dentistry and relates to a method and a system for producing a mockup of a patient's dental cosmetic restoration dental cosmetic restoration or a dental overlay device. It also relates to a control device for the fabrication of a mockup of a patient's dental cosmetic restoration or a dental overlay device. Finally, it also relates to a dental overlay device itself.

PRIOR ART

When a patient wishes to correct cosmetic deficiencies of one or more teeth, it is notably known practice, to supplement potential orthodontic treatment, to perform dental cosmetic restoration using ceramic veneers. The veneers are attached by adhesive bonding to the visible front faces of the teeth in order to obtain the desired cosmetic effect. Such attachment is accompanied by a modification of the existing teeth, notably the anterior surface thereof, in order to prepare them to accept the veneers, notably without overthickness, before the veneers are bonded on. This operation comprises, for example, a grinding of these visible front faces of the teeth in order to reduce their thickness and form a housing to accept the veneers, and is therefore permanent and irreversible. In addition, the associated bonding of the veneers is also permanent, generally using a powerful adhesive that generates irreversible strong adhesion of the two contacting surfaces. It is therefore not possible to remove the veneers and go back to the teeth in the undamaged initial state they were in before the cosmetic restoration was carried out.

Such cosmetic treatment is expensive and irreversible.

Before undertaking such cosmetic treatment which, by nature, is subjective, the patient needs to know and to visualize the envisageable end-result as best he can, and approve it.

One first solution is to show the patient a virtual mockup of the dental restoration by retouching a photograph of the patient in order to get as close as possible to the desired result. This method allows the patient to virtually visualize the envisageable end-result of the restoration in a way that is simple, quick and inexpensive. However, it does not allow the patient to gain a sufficiently realistic understanding of this result.

A second solution is to produce one or more temporary mockups, for example by implementing the following steps:
  producing an impression of the patient's dentition and jaw, for example in alginate or in silicone;
  taking a casting of the impression in order to obtain a three-dimensional initial model of the dentition, for example in plaster;
  producing a wax up on the plaster model, which means to say a mockup of the final dentition as desired, by adding wax to the initial plaster model;
  manufacturing a silicone key by taking an impression of the wax up and perforating the impression in the posterior;
  injecting a composite into the key then placing the latter in the mouth, the posterior perforation of the key making it possible to check the in-mouth positioning;
  after the composite has hardened, removing the key, making it possible to lay a temporary mockup made of composite directly over the teeth;
  possibly colouring and buffing the mockup (or temporary model) in order to give it a more natural appearance.

The mockup made of composite is fashioned to the desired shape directly on the teeth. It may then be applied to the patient over the top of his untreated teeth, his existing teeth remaining as they are. That allows him to evaluate the planned cosmetic restoration in vivo and with a certain degree of realism. At this stage, it is still possible to make modifications to the planned cosmetic treatment and to produce one, or even several, other temporary mockups. Once the planned cosmetic treatment has been validated by the patient and proved entirely satisfactory to him, notably from cosmetic and functional standpoints, the final treatment is prepared and then applied to the patient in order to obtain the same cosmetic result as he was able to visualize and validate using the mockup.

Producing one or more temporary mockups is a complex, lengthy and expensive process.

OBJECT OF THE INVENTION

In the light of the above observations, it is an object of the present invention to propose a less expensive and simpler solution for performing a smile makeover.

More specifically, one object of the present invention is to propose a solution for producing a mockup of a patient's dental cosmetic restoration which does not have all or some of the above disadvantages.

To this end, the invention relates to a method for producing a mockup of a patient's dental cosmetic restoration, characterized in that it comprises a step of forming a file of digital data representing the dental mockup artificially representing the restoration intended to be placed in the mouth and worn temporarily over at least part of the patient's dentition, and a step of fabricating the mockup directly from the file of digital data produced.

The method may comprise the following steps:
  obtention of initial digital data representing at least part of the dentition having an initial aesthetic appearance;
  at least partial virtual representation of the said dentition in its initial aesthetic appearance, on the basis of the initial data;
  modification of the virtual aesthetic appearance of the teeth in order to obtain a modified aesthetic appearance.

The modification step may comprise modification of at least some of the dental characteristics of the group including a tooth colour, a tooth shape, a tooth size and a dimension of the interdental space.

The modification step may be intended to make aesthetic modifications corresponding to modifications that can be made later by applying veneers to the teeth.

The dental mockup may comprise at least one housing that at least partially conforms to the shape of a tooth so that the mockup can be clipped onto the tooth.

The method may comprise the following substeps:
  Obtention of digital data representing the occlusal shape of the mockup at the level of at least one supporting tooth onto which the mockup is able to be clipped, by considering the negative of a virtual model representing all or part of the patient's dentition;
  Obtention of digital data representing all or part of the gingival ends of the mockup on the vestibular and/or lingual side.

The mockup may be designed to be clipped onto the dental arch with no function of correcting malpositioning of the teeth.

The mockup may comprise walls comprising a front part connected to a rear part, and possibly only the front part is complete.

The mockup may be produced from a recyclable and/or biocompatible material.

The mockup may be fabricated using an additive technique, notably by 3D printing.

The mockup may be fabricated by a technique involving the removal of material, notably by machining a block of material or laser or waterjet cutting.

The invention also relates to a device for the fabrication of a mockup of a patient's dental cosmetic restoration, characterized in that it comprises a module for obtaining initial digital data representing at least part of the patient's dentition having an initial aesthetic appearance, a module for creating virtual models representing all or part of the patient's dentition respectively in its initial aesthetic appearance and in at least one aesthetic appearance that is modified with respect to the initial appearance, and a central control and processing unit (UC) for implementing a method for producing a mockup of a patient's dental cosmetic restoration as described hereinabove.

The device may comprise a module for the at least partial virtual representation of the dentition in its initial appearance, on the basis of the initial data, and a module for modifying the virtual aesthetic appearance of the teeth in order to obtain a modified aesthetic appearance.

The invention also relates to a system for producing a mockup of a patient's dental cosmetic restoration, comprising a device for fabricating a dental mockup and the control device described hereinabove.

The system may comprise an image capture device.

The invention also relates to a computer program comprising program code instructions to control the execution of the steps of the method described hereinabove when the said program is executed by a processing unit.

To this end, the invention also relates to a dental overlay device intended to be worn removably and reusable, characterized in that it comprises at least one non-transparent anterior tooth face intended to be superposed on the vestibular face of an existing tooth, and means of removable attachment of the dental overlay device to at least one of the existing teeth acting as a support.

The dental overlay device may comprise a plurality of anterior tooth faces intended to be superposed on the anterior faces of a plurality of juxtaposed existing teeth.

The dental overlay device may comprise at least one housing to accommodate an existing support tooth, advantageously at least two housings, comprising an anterior wall bearing an anterior tooth face and an opposite posterior wall of smaller surface area than the anterior face and intended to cover the end part of the lingual face of the same existing tooth, notably while having a minimal impact on the occlusion, the two, anterior and posterior, walls being joined together and designed to grip the existing tooth acting as a support so as to allow the dental overlay device to be attached to the said existing tooth by clipping on.

The housing may at least partially conform to the shape of the existing tooth acting as a support.

The dental overlay device may have an anterior face comprising a thickness that is variable in all directions and/or have several anterior faces having mutually differing thicknesses.

The dental overlay device may have an anterior face and possibly a posterior face intended to come into direct contact with an existing tooth and/or intended to become attached removably to an existing tooth with no prior treatment or modification of the said existing tooth.

It is possible that only the anterior tooth wall of the dental overlay device completely covers the surface of an existing tooth.

The dental overlay device may comprise at least one anterior tooth face intended to be superposed on the vestibular face of an existing tooth and which has no posterior face intended to cover the lingual face of that same existing tooth.

The said anterior tooth face intended to be superposed on the vestibular face of an existing tooth may have a real-tooth coloration and/or be produced from a biocompatible material.

The means of removable attachment may comprise an adhesive and/or a clip and/or an anchorage and/or insetting means.

The said anterior face of the dental overlay device may bear a decorative element, notably a screen-printed graphic depiction or at least one coloured layer covering the entirety of the anterior face or decorative paintwork such as fluorescent or phosphorescent paint, or the dental overlay device may comprise a material incorporating a decorative property such as fluorescent or phosphorescent elements.

It is possible that the walls of the dental overlay device exert no force for moving the existing teeth.

The invention also relates to a use of the dental overlay device as described hereinabove to temporarily modify the aesthetic appearance of a dentition, the said use being renewable, or to visualize the future result of dental treatment, the said dental overlay device being attached removably to the existing teeth without exerting any dental treatment.

The invention is defined more specifically by the claims.

BRIEF DESCRIPTION OF THE DRAWINGS

These objects, features and advantages of the present invention will be set out in detail in the following description of one particular embodiment given by way of nonlimiting example in relation to the attached figures among which:

FIG. 3 depicts a three-dimensional view from the posterior face of a dental overlay device according to one particular exemplary embodiment.

FIGS. 4A to 4D depict front views of a dental overlay device bearing decorative elements, according to various particular exemplary embodiments.

DESCRIPTION OF PREFERRED EMBODIMENTS OF THE INVENTION

Figure 1:
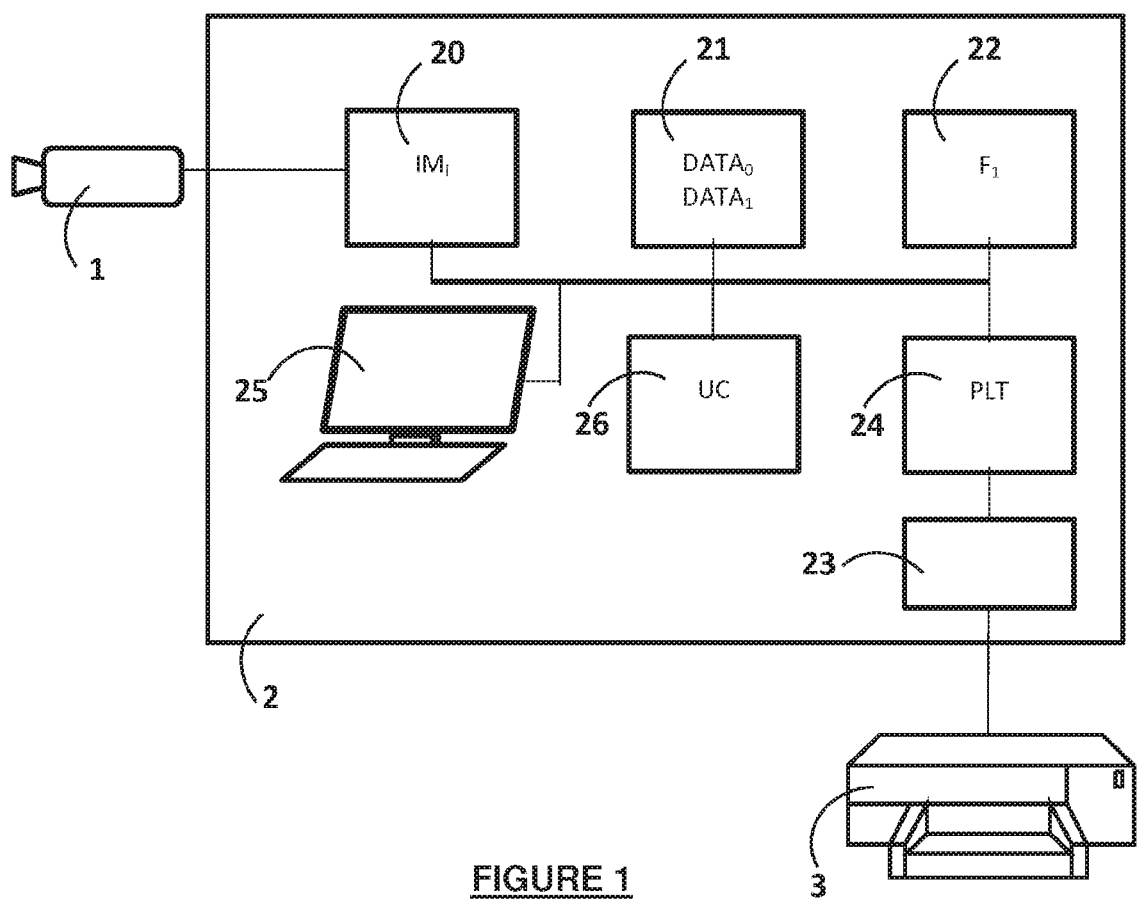
FIG. 1 depicts a diagram of the system for producing a mockup of a patient's dental cosmetic restoration, according to one exemplary embodiment of the invention.
Figure 2:
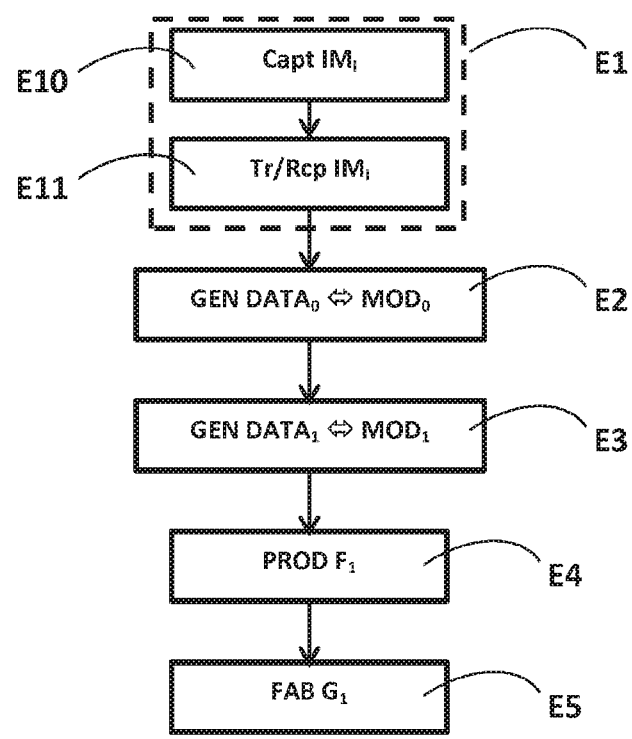
FIG. 2 depicts a flow diagram of the steps of the method for producing a mockup of a patient's dental cosmetic restoration according to one particular embodiment of the invention.

The method of the invention makes it possible to produce a mockup of a patient's dental cosmetic restoration. It comprises an operation of fabricating such a mockup which gives an artificial presentation, or simulation, of the envisaged future dental cosmetic restoration.

What is meant here by "dental cosmetic restoration" is any dental treatment of a cosmetic nature without orthodontics, namely without any treatment to correct malpositioning of the teeth by applying a continuous force to the teeth in order to make them move. For example, the dental cosmetic restoration may be carried out by attaching veneers made of ceramic (or other suitable material) to the visible face of one or more teeth. The cosmetic effect of the dental cosmetic restoration is essentially to modify the aesthetic appearance of the tooth or teeth concerned. It should not be confused with non-cosmetic dental treatment in which a more profound action on a tooth is performed, not only on the visible face, either for example by moving a complete existing tooth or by reconstituting a missing volume of a damaged existing tooth, for example by fitting a crown or a prosthesis. In the latter instance, the dental treatment has the main function of allowing the tooth to perform its natural function, notably chewing food. A prosthesis therefore has to address the key technical problem of withstanding high forces during chewing. By contrast, in dental cosmetic restoration according to the invention, the existing teeth concerned continue to perform the chewing function as before, only their visual appearance being transformed. Naturally, the dental cosmetic restoration of the invention can be combined with non-cosmetic dental treatment, it being possible for example for the fitting of veneers to supplement the addition of a prosthesis in order to complete all or part of a tooth.

What is meant by "artificial presentation" or "simulation" of the dental cosmetic restoration is that the dental mockup, which will be described hereinafter, artificially reproduces the envisaged result of the future dental cosmetic restoration.

A "dental mockup" or, more simply, "mockup", may take the form of a dental appliance, which reproduces the entire anterior surface of the teeth involved in the cosmetic restoration, namely the visible face of the teeth, and which incorporates a device for attachment to the real teeth, which means to say to the existing teeth. According to one embodiment, such a mockup comprises one or more housings or cavities intended for clipping onto at least part of a patient's tooth. Such a housing is delimited by the visible anterior wall of the mockup and by at least an opposite wall part, on the lingual side, which is connected to it by an occlusal wall which extends over the top, or even lateral, surface of the tooth, these complementary walls performing in combination a clipping function. These walls are preferably not very thick. The mockup may take different forms, comprise different materials, and concern all or some of a patient's teeth. It is possible for a housing to contain only some of the teeth, or even one entire tooth. There may be several housings in order to improve the retention of the mockup. The existing tooth or teeth housed in housings of the mockup are referred to as "supporting tooth or teeth". There may be just one mockup intended for one of the upper or lower dentitions, or more often there are two mockups, one for the patient's upper dentition and the other for his lower dentition.

The dental mockup is designed to be placed in the mouth and worn temporarily on at least part of the patient's dentition. It is designed to be attached temporarily to the dentition, without exerting any function of correcting malpositioning of the teeth, in other words without any orthodontic function. Once in the mouth on one or more of the patient's teeth, it does not exert on them enough force to cause the teeth to move over time.

According to another embodiment, the mockup is reduced to its minimalistic form and consists in only the visible anterior face of the teeth. In that case, it may be attached by any means, for example by adhesive bonding to the real teeth. In that case, such bonding is naturally temporary because the mockup is designed for temporary attachment. The adhesive used is different from a permanent adhesive and is intended for use of limited duration, which may range from a few days to a few months. This attachment is reversible. Therefore the mockup does indeed remain removable.

The invention relates to a rapid and low-cost method that makes it possible to fabricate a dental mockup, for example made of plastic, that can be placed in the mouth and worn temporarily by the patient.

Thus, this mockup can be fitted to the patient at the dental surgery and the patient will immediately be able to see the envisageable end result in vivo and make an enlightened decision regarding the cosmetic treatment proposed.

The method for producing a mockup of the envisaged dental restoration is implemented by a system here comprising the following elements:
an image capture device 1,
a control device 2 and
a fabrication device 3.

The fabrication method comprises a first step E1 of obtaining initial digital data relating to all or part of a patient's dentition. The dentition has an initial aesthetic appearance, or morphology, or aesthetic look. What is meant by "aesthetic appearance" is the morphology and/or aesthetic look of the patient's teeth. The aesthetic appearance may be defined by various aesthetic characteristics which for example comprise the colour of the teeth, their shape and their size, as well as the dimension of interdental spaces. The aesthetic appearance may also include small amounts of tooth overlap which can be concealed using dental veneers. In any event, these aesthetic characteristics defining the aesthetic appearance of the patient's teeth are characteristics that can be modified by dental treatment (or "dental cosmetic restoration") based on veneers attached to the teeth.

Step E1 comprises an image capture substep E10 during which the image capture device 1 takes digital images $IM_i$ (with i=1, 2, ... N where N is the total number of images captured) of all or part of the dentition in its initial appearance. The images taken contain characteristics of the teeth, notably characteristics relating to all or some of the following attributes: shape, colour, interdental space, position (notably for concealing small overlaps). These attributes are representative of the aesthetic appearance of the teeth concerned. The image capture device 1 is advantageously an intra-buccal camera intended to take images directly inside the patient's mouth. As an alternative, a three-dimensional model of all or part of the patient's dentition may be fabricated beforehand, in the known way, as a casting made of an impression of the dentition, then digital images can be taken of the model using the image capture device.

The image data $IM_i$ (where i=1, 2, ..., N) represent all or part of the patient's dentition in its initial appearance. They are transmitted to the control device 2 and received by the control device 2, in a transmission substep E11.

The step E1 of digitizing the dentition and transmitting initial digital data $IM_i$ is followed by a step E2 of virtual 3D representation of all or part of the said patient's dentition, on the basis of the initial digital data received (namely the image data $IM_i$). One component of the control device 2 processes the image data $IM_i$ received and generates an initial digital data set, denoted $DATA_0$, representing an initial virtual 3D model $MOD_0$. This model $MOD_0$ virtually represents all or some of the patient's teeth in their initial appearance (notably in terms of shape, colour, interdental space, position). It is represented virtually, for example by being displayed on a screen of the control device 2, so as to allow an operator to visualize and manipulate it virtually.

The representation step E2 is followed by a step E3 of virtual modification of the dentition modelled (in full or in part). The modification step allows the aesthetic appearance of the teeth modelled to be modified. It is therefore designed to make cosmetic modifications to the real dentition modelled. These modifications here correspond to modifications that can be made later by the fitting of dental veneers to one or more teeth. The modifiable dental characteristics may be morphological and/or aesthetic. They relate for example to at least one of the following aesthetic characteristics:
- the tooth colour;
- a tooth shape and/or size (or dimension), for example in the case of teeth that are worn, broken, too short or exhibit other defects of this type;
- a dimension of an interdental space.

The modification E3 may also make it possible to hide small malpositionings of teeth such as small amounts of overlap.

The modification or modifications made virtually to one or more modelled tooth or teeth make it possible to obtain a modified aesthetic appearance of the dentition. This modified aesthetic appearance is intended to improve, beautify, the individual's smile. It therefore notably determines the vestibular face of the ideal, corrected, dentition. Thus, during step E3, a three-dimensional virtual model $MOD_1$ of at least part of the patient's dentition which has an aesthetic appearance that is modified with respect to the initial aesthetic appearance is created. This model $MOD_1$ is defined by a dataset $DATA_1$. This model also potentially describes the housings or shapes suited to performing the function of removable attachment to at least one existing tooth, without modification or treatment of this existing tooth.

Steps E2 and E3 are executed by a software component of the control device 2. The modified appearance of the teeth is obtained in this instance virtually by a manipulation of one or more modelled teeth carried out by an operator using man-machine interface means 25 of the control device 2. Note that any method of the prior art that makes it possible to define cosmetic veneers can be implemented. This step can thus be completely or partially automated. The result of this step is a digital dataset representing a virtual model of the corrected aesthetic appearance of the patient's dentition.

The method continues with a step E4 of producing a digital data file $F_1$ virtually representing a dental mockup $G_1$ suited to the patient's dentition and artificially reproducing the envisaged cosmetic restoration according to the modified appearance obtained in step E3. What is meant by the expression "suited to the patient's dentition" is that the mockup is designed to conform to the shape of at least some of the patient's existing teeth. In the embodiment that allows the mockup to be attached by clipping or insetting, the mockup comprises surfaces designed to conform to the shape of one or more supporting teeth belonging to the patient and the digital data comprise the three-dimensional geometric definition of these surfaces.

The digital file $F_1$ representing the dental mockup $G_1$ therefore contains a digital dataset defining the structure of the mockup and possibly data of use in constructing the mockup $G_1$. It is determined automatically on the basis of the virtual model $MOD_1$ of all or part of the patient's dentition that has the modified aesthetic appearance, as created during step E3, or in other words, on the basis of the digital dataset $DATA_1$. The digital file $F_1$ of the mockup $G_1$ may thus notably contain instruction data intended to control the fabrication of the dental mockup $G_1$ by the fabrication device 3.

The mockup $G_1$ constitutes a mockup of the patient's future dental cosmetic restoration, this restoration work here being intended to be performed by fitting one or more dental veneers to the visible front face of one or more of the patient's teeth.

According to one embodiment, the mockup G1 comprises a front part and a rear part which are joined together and leave housings to accept supporting teeth. It is designed to conform to the shape of the supporting teeth so that it can be placed in the mouth and worn temporarily over at least part of the patient's dentition. The front part comprises a wall intended to completely cover the visible front surface of one or more of the patient's teeth. This front wall artificially reproduces the envisageable end result of cosmetic restoration work using dental veneers, notably at the level of the visible exterior surface thereof. It incorporates the modified characteristics defined during step E3 relating notably to the shape of the teeth, their colour, their size and the interdental spaces. The rear part may comprise a wall designed to completely or partially cover the rear of the supporting tooth or teeth. This wall may have openwork regions. In one advantageous embodiment, only the front part of the mockup is complete (which means to say completely covers the front face of the support teeth housed in the mockup).

Note that step E4 which is implemented in the case of a mockup that is to be clipped onto the teeth, may comprise several substeps of automatically determining the contours of the mockup, these including:
- in a substep E41, the digital data representing the occlusal form of the mockup at the level of the supporting teeth are obtained by constructing the negative of a virtual model $MOD_1$, representing all or part of the patient's dentition, established in step E3;
- the mockup is designed to best conform to the occlusion of the two, upper and lower, dental arches so as not to interfere, or as to interfere as little as possible, when they come into contact when the mouth is in the closed position. More specifically, the posterior faces of the mockup intended for the upper dental arch preferably do not extend as far as the gum limit. They do not comprise any material at the level of the occlusion of the teeth, namely where the teeth of the lower dentition come to rest against the lingual face of the teeth of the upper dentition. This occlusion is automatically detected by the virtual reproduction of an individual's existing dentition, and defines a limit in the dimensioning of the rear wall of the upper dentition overlay device;
- in another substep E42, the digital data representing one or the gingival ends of the mockup, on the vestibular and/or lingual sides, are obtained. A first approach considers the digital data of the virtual model $MOD_1$, representing all or part of the patient's restored dentition, established in step E3, and the gingival ends are established on the basis of the ends given by the virtual model. A second approach is to fix average tooth heights previously stored in an electronic memory for certain categories of teeth and to base the calculation of gingival ends on these mean values and the knowledge of the type of tooth concerned. The gingival ends of the mockup are calculated to correspond to the actual boundary between the real dentition and the real gum. This determination allows the height of the visible anterior faces of the mockup to be adjusted to best suit.

According to an alternative form of embodiment, the mockup also reproduces part of the gum. It thus comprises a surface that may cover the existing gum or an existing tooth. In this alternative form of embodiment, it is thus possible to correct cosmetic defects caused by an irregular gum line, notably when one or more teeth are suffering from receding gums. This alternative form of embodiment makes it possible to redefine a continuous and aesthetically pleasing gum line, while at the same time defining the optimum gingival end of the mockup.

The method then moves on to a step E5 of fabricating the dental mockup, denoted $G_1$. Fabrication is performed by the fabrication device 3. It may use an additive manufacturing technique, for example 3D printing. As an alternative, it may use a technique of fabrication through the removal of material. In that case, the dental mockup is fabricated for example by machining from a block of material, or laser or waterjet cutting. In any event, the fabrication method uses a biocompatible material, for example of resin or ceramic type, or even a metal.

During the fabrication step E5, the fabrication device 3 is driven by controls obtained from the digital file corresponding to the dental mockup that is to be fabricated. In this particular instance, the control device 2 sends the fabrication device 3 fabrication control instructions (for example instructions to control the 3D printing or instructions to control machining, depending on the technique used). As an alternative, the control device 2 could transmit the file $F_1$ to the fabrication device. In that case, the fabrication control instructions would be generated from the file $F_1$ directly by the fabrication device.

The material used for the fabrication of the dental mockup may be a biocompatible material. It is advantageously recyclable. That means that used (and ultimately little-used) mockups can be recycled to fabricate new mockups.

By virtue of the production of a digital file for constructing a mockup, this mockup can be fabricated directly, with no intermediate step of producing an actual 3D model of the patient's dentition. As a result, the mockup can be fabricated quickly at the dental surgery. A single visit to the dentist may even be enough to obtain the initial data $DATA_0$ representing (all or part of) the patient's dentition, to fabricate the mockup and have the patient try it out.

Of course, several digital files $F_1, F_2, \ldots$, for constructing several dental mockups $G_1, G_2, \ldots$, could be generated so as to allow the patient to test several alternative forms of dental cosmetic restoration.

As an alternative, the method may implement an intermediate step E4' that allows an operator to visualize the mockup laid virtually over the virtual representation of the individual's existing dentition, for example using a man-machine interface on a screen. This virtual representation is three-dimensional and allows an operator to visualize not only the anterior face of the device, in order to validate the aesthetic result obtained, but also the rear face in order to check the attachment function.

The device 2 driving the fabrication of a mockup comprises the following modules:
- a module 20 for obtaining initial digital data representing all or part of a dentition having an initial appearance, in this instance image data $IM_i$;
- a module 21 for creating virtual models $MOD_0$, $MOD_1$ representing all or part of the patient's dentition respectively in its initial aesthetic appearance and in at least one appearance that is modified with respect to the initial appearance;
- a production module 22 able to produce at least a digital data file $F_1$ representing a dental mockup $G_1$ suited to the patient's dentition and corresponding to an appearance that is modified with respect to the initial appearance, created by the module 21;
- a connection interface 23 for connecting to the fabrication device 3;
- a driver module 24 able to drive a mockup fabricating device on the basis of the digital data file $F_1$;
- man-machine interface means 25;
- a central control and processing unit (UC) 26.

The module 20 comprises a connection interface for connection to the image capture device 1 and means of receiving initial digital data, containing image data $IM_i$ captured and transmitted by the image capture device 1, and for supplying these initial data to the module 21 that creates virtual models. The image data received are obtained by image captures of all or part of the patient's dentition using the image capture device 1. The module 20 is intended to implement step E11 (on receipt).

The model creation module 21 incorporates a software component making it possible to:
- create a first three-dimensional virtual model $MOD_0$ representing all or part of the patient's dentition with an initial appearance;
- create at least one second three-dimensional virtual model $MOD_1$ representing all or part of the patient's dentition with an appearance that is modified by modifying aesthetic characteristics of the teeth (notably shape, colour, size, interdental space);
- manage the displaying of the virtual models created or in the process of being created on a screen of the device 2.

The creation module 21 is designed to implement steps E2 and E3.

The production module 22 is intended to create a digital file $F_1$ relating to a dental appliance. The digital file represents a mockup suited to the patient's dentition and reproducing dental cosmetic restoration yielding an appearance that is modified, at least on the front face of the dentition, with respect to the initial dental arrangement. The production module 22 is designed for implementing step E4.

The connection interface 23 allows the control device 2 to be connected to an external device 3 for the fabrication of a mockup, for example a 3D printer.

The driver module 24 is designed to drive the operation of the fabrication device 3, on the basis of a digital file produced by the module 22. It is intended to transmit control instructions to the fabrication device 3 to drive the fabrication of an orthodontic appliance. The driver module 24 is intended to control the execution of the fabrication step E5 directly on the basis of the digital file produced.

The modules 21, 22 and 24 are software modules containing software instructions for the execution of the corresponding method steps when the modules are executed by the processing unit 26.

The man-machine interface 25 comprises a display screen and/or any other data feedback means, a keyboard and/or any other data and/or control input means, and a graphic interface GUI (Graphical User Interface).

Finally, the control device 2 comprises a central processing unit 26, here comprising a microprocessor, to which all the elements 20-25 of the device are connected and intended to control the operation thereof.

The invention also relates to a system comprising the image capture device 1, the control device 2 and the fabrication device 3. The three components 1, 2 and 3 of the system are separate here. The image capture device 1 and the fabrication device 3 may be connected to the control device by a wired or wireless connection. As an alternative, the image capture device 1 and/or the fabrication device 3 may be incorporated into the control device 2.

The invention also relates to a computer program containing program code instructions for executing steps of the method described hereinabove when the said program is executed by a processing unit, in this instance the unit 26.

In an alternative form of embodiment, the dental mockup could be fabricated in the conventional way by implementing the following steps:
- producing an impression of the patient's dentition and jaw, for example in alginate or in silicone;
- fabricating a three-dimensional model of the dentition, for example in plaster, by taking a casting of the impression produced and used as a mould;
- moulding the dental mockup from the three-dimensional model using thermoforming;
- possibly treating the mockup (colouring, buffing or other cosmetic treatment).

According to another alternative form of embodiment, the mockup could be designed to be worn for a longer length of time, or even to form a near-permanent or permanent cosmetic restoration. In that case, the clipping onto the dental arch is chosen to perform very well, to be stable and reliable. The mockup remains removable. In such an alternative form of embodiment, the mockup becomes a dental overlay device. Such a dental overlay device may be intended to be worn removably and reusable.

The present invention therefore also relates to a dental overlay device intended to be worn removably and reusably by an individual in order to temporarily improve their smile, for example during a day of work or during an evening engagement. After use, the individual can remove the dental device, notably at night. It can be reused and may be worn multiple times. FIG. 3 depicts, by way of example, such a dental overlay device.

What is meant by "dental overlay" or "dental facing" device is a dental device or appliance intended to cover the vestibular face (namely the face facing towards the outside of the mouth) of one or more of an individual's existing teeth in order to improve their smile, or in other words, the visible cosmetic appearance of at least part of their existing dentition.

The device has no orthodontic treatment function, notably no function of correcting malpositioning of teeth. It does not exert any force on the teeth, any force liable to cause a tooth to move. In addition, it is designed to fit the existing teeth, without any need for prior treatment of the said teeth.

The dental overlay device may take the form of a reusable dental appliance, in other words one the use of which can be renewed, which comprises one or more non-transparent anterior tooth faces intended to be superposed on the vestibular faces of the existing teeth with a view to improving the individual's smile, namely the aesthetic appearance of the visible face of the teeth when the individual smiles. The dental overlay device incorporates means of removable attachment to one or more existing teeth, which will be referred to hereinafter as tooth or teeth acting as a support or "support tooth or teeth". It may be placed into the mouth by the user himself.

According to one embodiment, the attachment means comprise one or advantageously several housings or cavities to accommodate a support tooth and for attaching to this support tooth. These housings are intended to accommodate support teeth and to be clipped by gripping onto these support teeth or to be attached simply by insetting these support teeth into them, so as to attach the dental device to these teeth. The dental overlay device thus comprises a means of removable attachment of the clipping or insetting type. The housing for a support tooth at least partially conforms to the shape of this support tooth. It conforms to the shape of at least the vestibular face and part of the lingual face of an existing tooth. The posterior face of such a dental overlay device conforms as well as possible to the natural occlusion of the existing teeth. In the case of a dental overlay device intended for the upper dental arch, this posterior face contains no material at the level of the occlusion of the lingual face of the existing teeth, and thus has no impact on this occlusion. It does not extend as far as the gingival limit on the lingual side, unlike on the vestibular side. Thus, the aforementioned housing conforms to just part of the peripheral surface of a tooth.

In other words, a housing for accommodating a support tooth is delimited by an anterior wall and by an opposite posterior wall intended to be oriented towards the lingual side. The anterior wall bears or forms the visible anterior tooth face intended to perform the cosmetic function. The posterior form is dimensioned so that it only partially covers the lingual face of the support tooth, for example just an upper part of the support tooth (at the opposite end to the gingival end of the tooth). Thus, only the anterior wall is complete, hides the entirety of the vestibular face of the support tooth. These two anterior and posterior walls of the dental overlay device are joined together by an occlusal wall which extends over the upper part of the support tooth. The anterior, posterior and occlusal walls of the housing accommodating the support tooth and for fixing onto the latter are designed to perform a clipping function, namely to grip the tooth, or simply allow the tooth to be inset into it, so as to attach the dental device to the support tooth. When it is being fitted, the dental device therefore has the support teeth inset into it through the application of a small amount of force. Note that the various faces of the dental overlay device thus come into direct contact with the surface of the existing tooth that they cover, with no intermediate space and no introduction of any interface product between them.

There may be certain housings intended only to accommodate or house existing teeth, without having the function of attaching to these teeth. The dental overlay device advantageously comprises parts that have only anterior faces intended to cover a vestibular face of a tooth, performing therefore only the cosmetic function, without having an attachment function. These anterior faces are connected to one another laterally to ensure the continuity of the device. This approach makes it possible to obtain the simplest possible geometry for the dental overlay device, minimizing the number of attachment housings to the strict minimum required to achieve sufficient attachment.

Let us assume that the dental device affects N of an individual's teeth. In a first embodiment, the dental overlay device comprises N housings to accept the N teeth respectively and all of the N housings are designed to perform a function of attachment to the N teeth constituting N support teeth. In an advantageous second embodiment, the device comprises N housings to accept N teeth respectively and just a subset of these N housings, comprising n housings (where n is strictly lower than N and preferably greater than or equal to 2), is designed to perform a function of attachment to n support teeth. In a third embodiment, the dental device comprises p housings for accepting p teeth (where p is strictly lower than N and preferably greater than or equal to 2) and N-p anterior walls not coupled to posterior walls.

These N-p walls are therefore confined to an anterior wall, or alternatively also comprise all or part of an occlusal wall, or even all or part of an intermediate lateral wall (between two teeth) but not posterior wall. The p housings may be fully or partly suited to providing attachment to the support teeth.

The walls of the dental overlay device are preferably not very thick, particularly the posterior walls which perform only the attachment function. The anterior walls, which perform the cosmetic function, in addition to a potential attachment function, have a thickness that can vary to compensate for the deficiencies of the vestibular face of the existing teeth, it being possible for this thickness if necessary to be great. This thickness may be greater than or equal to 0.3 mm, without any real upper limit. However, the desired cosmetic effect will generally be obtained with a thickness varying within a range from 0.3 to 3 mm inclusive. In order to compensate for cosmetic deficiencies of the existing teeth, these thicknesses may vary according to all or some of the following solutions:

- For a given height of an anterior face of the dental overlay device (this height being chosen in the direction extending from the gingival limit to the limit opposite the gum), the thickness of the anterior wall can vary (namely vary in a right-left direction); and/or
- This thickness may vary from the gingival limit towards the opposite limit; and/or
- The various anterior faces of the device may have different thicknesses.

To sum up, the thickness of the anterior wall of a dental overlay device according to the invention may vary in all directions on the one same anterior face and/or on the collection of anterior faces.

Furthermore, the anterior walls are non-transparent. They have the coloration of a tooth. The posterior and occlusal walls may be transparent or non-transparent, for example may also have the coloration of a tooth. Finally, the device may have different forms, comprise different materials and apply to all or some of an individual's teeth.

The dental overlay device may be intended for one of the dentitions, upper or lower. Two devices may be planned, one for the upper dentition and one for the lower dentition of an individual. Each device, like the mockup described hereinabove incidentally, may extend over any number of juxtaposed teeth, preferably at least from one canine to the other. A dental overlay device is advantageously symmetric about a mid-plane, its right-hand part being symmetric with its left-hand part.

The dental device is designed to be placed in the mouth and worn removably and reusably. It is advantageously designed to be worn temporarily over the existing dentition, without exerting a function of correcting malpositioning of the teeth, notably without an orthodontic function or any other dental treatment. Once fitted into the mouth over one or several of a user's teeth, it does not exert on these enough force to cause the teeth to move over the course of time. It has a cosmetic function of improving the user's smile. It can be worn trouble-free for several hours, for example for a day at work or an evening engagement, and then removed, notably at night. It is reusable and designed to be worn numerous times.

According to another form of embodiment, the dental device is reduced to its minimal form and consists of only the visible anterior face of the teeth. It that case, it can be attached by any means other than clipping, for example by being bonded directly to the existing teeth, without prior treatment of these teeth. In this embodiment, the means of removable attachment of the dental overlay device to at least one existing tooth is adhesive bonding, which is not a permanent bonding but reversible.

The dental overlay device may also be designed to be attached to an accessory present in a person's mouth, other than an existing tooth. This may be an implant or an abutment on an implant, or any dental restoration. For that, the device comprises a removable attachment means allowing for example clipping onto such a component. As an alternative, this removable attachment means may allow anchorage onto such a component, notably in a direction of movement perpendicular to the gum.

The dental overlay device can also be adapted to a situation in which an individual has one (or more) missing tooth or teeth. In such a case, the dental overlay device may comprise a block of a volume similar to the volume of the missing tooth, so as to clip inbetween the existing two adjacent teeth and fill the gap caused by the missing tooth. This block naturally has an anterior face that reproduces the chosen aesthetic appearance of the missing tooth.

The dental overlay device of the invention may be used to temporarily modify the aesthetic appearance of an individual's dentition, the use of the device being renewable. It could also be used to allow the future result of a dental treatment envisaged for an individual to be visualized. As this individual would be able to wear the dental device for a few hours, or even for a whole day, he would thus gain an optimal understanding of the hoped-for result of the planned cosmetic restorative work on his dentition.

According to another embodiment, one or more anterior faces of the dental overlay device bear decorative elements, such as drawings or other graphical depictions (for example a Mickey Mouse head, a flag, a diamond) screen-printed onto the anterior face or a decorative coloured layer, or several juxtaposed coloured layers, covering the entirety of the anterior face (for example blue/white/red layers), as depicted in FIGS. 4A to 4D. This decoration may be obtained by particular paintwork, for example to form a fluorescent or phosphorescent effect. As an alternative, the decorative effect may be obtained by the material of the dental overlay device itself, which may, for example, incorporate fluorescents or phosphorescent elements.

More generally, the features described hereinabove in relation to a dental overlay device can be adapted to a mockup as described previously, and vice versa. Furthermore, the invention also relates to a method for the fabrication of a dental overlay device for a user, similar to the method described hereinabove for the fabrication of a mockup of a patient's dental cosmetic restoration.

The invention claimed is:

1. A method for producing a mockup of a patient's dental cosmetic restoration or a dental overlay device intended to be worn removably, comprising:
   - obtaining initial digital data representing at least part of the dentition having an initial aesthetic appearance;
   - forming at least partial virtual representation of the said dentition in its initial aesthetic appearance, on the basis of the initial data;
   - modifying the virtual aesthetic appearance of the teeth in order to obtain a modified aesthetic appearance,
   - forming a file of digital data representation based on the modified aesthetic appearance representing the mockup of a dental cosmetic restoration or the dental overlay device, adapted to be placed in a mouth and worn temporarily over at least part of an existing dentition,
   - fabricating the mockup or the dental overlay device directly from the file of digital data produced;

wherein the fabricating the dental mockup or the dental overlay device comprises forming at least one housing that at least partially conforms to a shape of an existing tooth so that the mockup can be clipped onto the existing tooth, wherein the fabricating the mockup or the dental overlay device comprises forming the mockup or the dental overlay device adapted to be clipped to the dental arch without having a function of correcting malpositioning of the teeth, and wherein the fabricating the mockup or the dental overlay device includes forming the mockup or the dental overlay device with a thickness that compensates for deficiencies of vestibular faces of the existing teeth by at least one of a) an anterior face having a thickness that is varied, b) an anterior face having a thickness that is varied in all directions, and c) several anterior faces having mutually differing thicknesses.

2. The method according to claim 1, wherein the modifying comprises modifying at least one dental characteristic selected from the group consisting of a tooth color, a tooth shape, a tooth size and a dimension of the interdental space.

3. The method according to claim 1, wherein the modifying is adapted to make aesthetic modifications corresponding to modifications that can be made later by applying veneers to the teeth.

4. The method according to claim 1, comprising at least one selected from the group consisting of:
   obtaining digital data representing an occlusal shape of the mockup or of the dental overlay device at at least one existing tooth acting as a support and onto which the mockup or the dental overlay device is able to be clipped;
   obtaining digital data representing all or part of gingival ends of the mockup or of the dental device on a vestibular and/or lingual side,
   determining an occlusion of the existing dentition of an individual and determining a geometric limit so that the mockup or the dental overlay device has a minimal impact on the occlusion; and
   forming a virtual three-dimensional representation of the mockup or of the dental overlay device on a human-machine interface.

5. The method according to claim 1, wherein the fabricating the mockup or the dental overlay device comprises forming part of a gum, at least part of which forms a surface intended to cover an existing gum.

6. The method according to claim 1, wherein the fabricating the mockup or the dental overlay device comprises forming walls comprising a front part connected to a rear part, wherein only the front part is complete.

7. The method according to claim 1, wherein fabricating the mockup or the dental overlay device is performed using a recyclable and/or biocompatible material.

8. The method according to claim 1, wherein the mockup or the dental overlay device is fabricated by a technique involving the addition of material.

9. The method according to claim 1, wherein the mockup or the dental overlay device is fabricated by a technique involving the removal of material.

10. The method according to claim 1, wherein said initial digital data represents only the dentition.

11. The method according to claim 1, wherein said initial digital data representing at least part of the dentition three-dimensionally represents said at least part of the dentition.

12. The method according to claim 1, wherein said digital data representation is a three-dimensional representation.

* * * * *